US012091991B2

(12) United States Patent
Zecha et al.

(10) Patent No.: US 12,091,991 B2
(45) Date of Patent: Sep. 17, 2024

(54) SYSTEM FOR AN IMPROVED STATOR ASSEMBLY

(71) Applicant: Raytheon Technologies Corporation, Farmington, CT (US)

(72) Inventors: Sarah J. Zecha, Concord, NH (US); Brian Barainca, Kennebunk, ME (US); Brian Duguay, South Berwick, ME (US); Uriah C. Noble, Sanford, ME (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/190,864

(22) Filed: Mar. 27, 2023

(65) Prior Publication Data

US 2024/0011405 A1 Jan. 11, 2024

Related U.S. Application Data

(62) Division of application No. 17/735,327, filed on May 3, 2022, now Pat. No. 11,643,937, which is a division of application No. 16/667,501, filed on Oct. 29, 2019, now Pat. No. 11,352,895.

(51) Int. Cl.
*F01D 9/04* (2006.01)

(52) U.S. Cl.
CPC ........ *F01D 9/042* (2013.01); *F05D 2220/323* (2013.01); *F05D 2230/60* (2013.01); *F05D 2300/437* (2013.01)

(58) Field of Classification Search
CPC ..... F01D 9/00; F01D 9/02; F01D 9/04; F01D 9/041; F01D 9/042; F01D 9/044; F04D 29/54; F04D 29/541; F04D 29/542; F05D 2230/60; F05D 2300/413; F05D 2300/437; F05D 2220/323
See application file for complete search history.

(56) References Cited

U.S. PATENT DOCUMENTS

| | | | |
|---|---|---|---|
| 2,914,300 | A | 11/1959 | Sayre |
| 3,708,242 | A | 1/1973 | Bruneau et al. |
| 4,305,696 | A | 12/1981 | Pask |
| 5,765,993 | A | 6/1998 | Weiss |
| 6,619,917 | B2 | 9/2003 | Glover |
| 8,182,213 | B2 | 5/2012 | Cheung |
| 8,966,756 | B2 | 3/2015 | Feigleson et al. |

(Continued)

OTHER PUBLICATIONS

USPTO; Notice of Allowance dated Feb. 23, 2022 in U.S. Appl. No. 16/667,501.

(Continued)

*Primary Examiner* — Elton K Wong
(74) *Attorney, Agent, or Firm* — SNELL & WILMER L.L.P.

(57) ABSTRACT

An improved stator assembly for use in a gas-turbine engine is disclosed. The stator assembly may comprise a vane, an inner diameter (ID) ring, an outer diameter (OD) ring, a vane disposed between the ID ring and the OD ring, a potting component coupling the vane to at least one of the OD ring or the ID ring, and a potting embedded component disposed within the potting component. The potting embedded component may prevent disbond of the potting component during operation of the gas-turbine engine.

8 Claims, 10 Drawing Sheets

(56) References Cited

U.S. PATENT DOCUMENTS

| | | | | |
|---|---|---|---|---|
| 9,957,980 | B2 | 5/2018 | Englebert | |
| 2005/0129520 | A1* | 6/2005 | Harper | F01D 25/06 416/204 R |
| 2010/0166545 | A1 | 7/2010 | Schuler | |
| 2010/0272565 | A1 | 10/2010 | Cheung | |
| 2012/0251313 | A1 | 10/2012 | Eleftheriou et al. | |
| 2016/0024971 | A1* | 1/2016 | Pearce | F01D 9/042 415/208.1 |
| 2016/0298765 | A1 | 10/2016 | Busby et al. | |
| 2019/0284945 | A1* | 9/2019 | King | F01D 9/041 |

OTHER PUBLICATIONS

USPTO; Final Office Action dated Dec. 3, 2021 in U.S. Appl. No. 16/667,501.
USPTO; Requirement for Restriction/Election dated Mar. 25, 2021 in U.S. Appl. No. 16/667,501.
USPTO; First Action Interview dated Jul. 29, 2021 in U.S. Appl. No. 16/667,501.
USPTO; Preinterview first office action dated Jun. 7, 2021 in U.S. Appl. No. 16/667,501.
USPTO; Non-Final Office Action dated Nov. 10, 2022 in U.S. Appl. No. 17/735,327.
USPTO; Notice of Allowance dated Jan. 31, 2023 in U.S. Appl. No. 17/735,327.

* cited by examiner

SECT A-A

SECT B-B

SECT C-C

SYSTEM FOR AN IMPROVED STATOR ASSEMBLY

CROSS-REFERENCE TO RELATED APPLICATIONS

This application is a divisional of, and claims priority to, and the benefit of Non-Provisional application Ser. No. 17/735,327, filed May 3, 2022 for SYSTEM FOR AN IMPROVED STATOR ASSEMBLY. The '327 application is a divisional of, and claims priority to, and the benefit of Non-Provisional application Ser. No. 16/667,501, filed Oct. 29, 2019 for SYSTEM FOR AN IMPROVED STATOR ASSEMBLY, which issued as U.S. Pat. No. 11,352,895 on Jun. 7, 2022. Both of which are incorporated in their entireties by reference herein for all purposes.

FIELD

The present disclosure relates to gas turbine engines, and more specifically, to a system for an improved stator assembly.

BACKGROUND

Gas turbine engines typically include a compressor section to pressurize inflowing air, a combustor section to burn a fuel in the presence of the pressurized air, and a turbine section to extract energy from the resulting combustion gases. The compressor section typically may comprise alternating rows of rotors and stators, ending with an exit guide vane. The exit guide vane may be angled to remove swirl from the inflowing air, before directing air into a diffuser assembly.

SUMMARY

A stator assembly is disclosed herein. The stator assembly may comprise: a vane; ring having a slot configured to receive the vane; a potting component disposed between the vane and the ring, the potting component configured to join the vane and the ring; and a potting embedded component disposed within the potting component, the potting embedded component configured to reduce internal tension in the potting component.

In various embodiments, the potting embedded component is at least one of a woven structure or a chain-link structure. A first end of the potting embedded component may be tangent to a non-gas path surface of the ring, and wherein a second end of the potting embedded component is tangent to a pressure side of the vane. The potting embedded component may comprise a sheet. The potting embedded component may be disposed around a perimeter of the vane. The potting embedded component may comprise a serpentine shape. The potting embedded component may contact a portion of the vane and a portion of a wall of the slot. The potting embedded component may be non-metallic.

A stator assembly is disclosed herein. The stator assembly may comprise: a vane comprising a suction side and a pressure side; a ring having a slot configured to receive the vane; a potting component disposed between the vane and the ring, the potting component configured to join the vane and the ring; a first potting embedded component disposed on the suction side of the vane, the first potting embedded component disposed within the potting component; and a second potting embedded component disposed on the pressure side of the vane, the second potting embedded component disposed within the potting component.

In various embodiments, the first potting embedded component may comprise a first flange and a second flange disposed radially outward from the first flange, the second flange defining a groove, and wherein the groove receives a wall defined by the slot of the ring. The first potting embedded component may comprise a plurality of fingers, each finger in the plurality of fingers extending from the second flange toward the vane and radially away from the second flange. Each finger in the plurality of fingers may include a convex surface opposite the vane. The first potting embedded component and the second potting embedded component may be deformable. The first potting embedded component and the second potting embedded component may be configured to receive the vane during assembly of the stator assembly.

A gas-turbine engine is disclosed herein. The gas-turbine engine may comprise: a stator assembly, comprising: an inner diameter (ID) ring; an outer diameter (OD) ring disposed radially outward from the ID ring; a vane disposed between the ID ring and the OD ring; a slot disposed in at least one of the ID ring or the OD ring; a potting component disposed in the slot, the potting component coupling the vane to the slot; and a first potting embedded component disposed within the potting component, the first potting embedded component comprising a non-metallic material.

In various embodiments, the first potting embedded component may be at least one of a woven structure or a chain-link structure. The first potting embedded component may comprise a sheet disposed around a perimeter of the vane in the slot. The first potting embedded component may comprise a serpentine shape, and wherein the first potting component contacts a portion of the vane and a portion of a wall of the slot. The first potting embedded component may be disposed on a pressure side of the vane. The stator assembly may further comprise a second potting embedded component disposed on a suction side of the vane.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
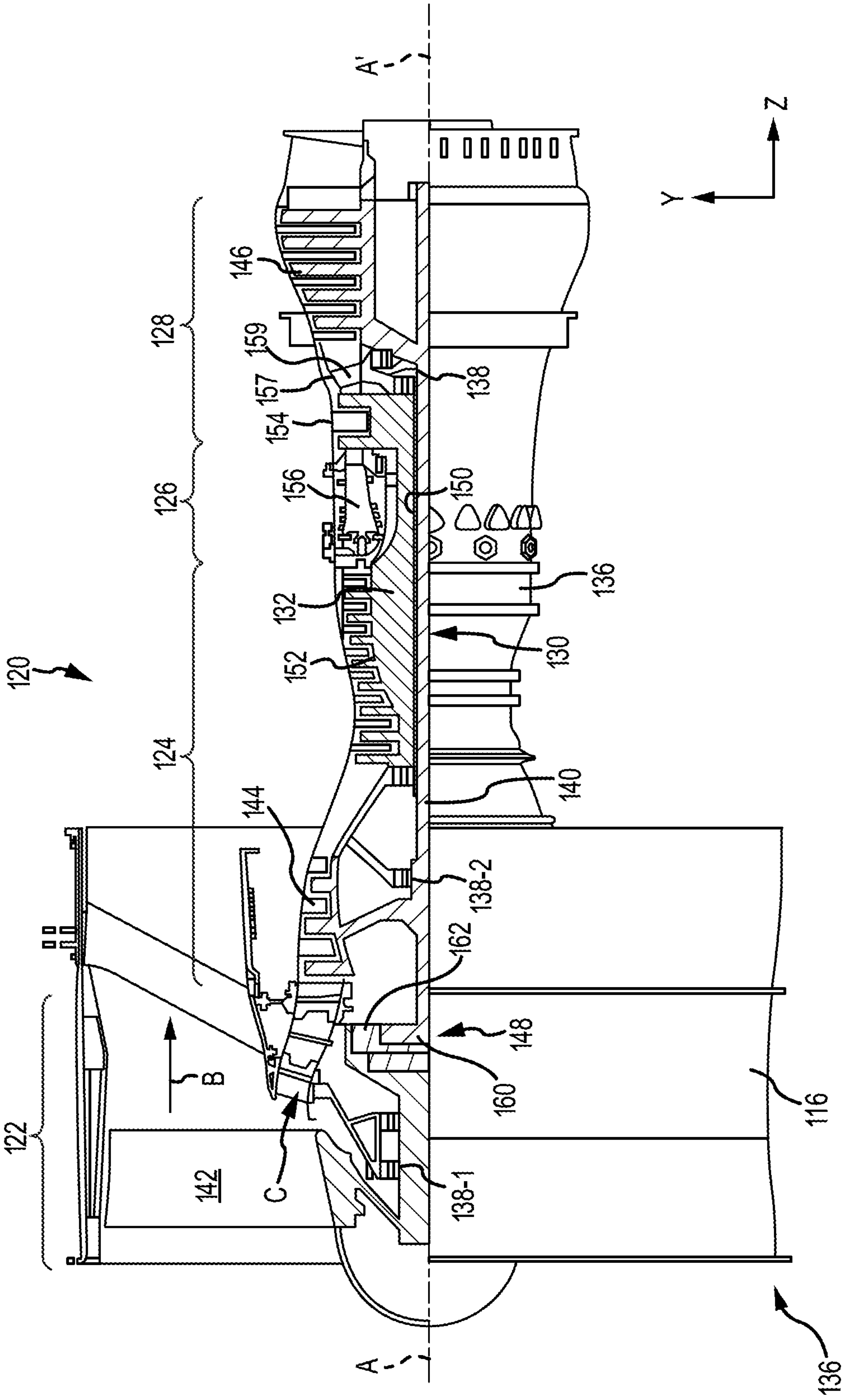
FIG. 1 illustrates a gas turbine engine, in accordance with various embodiments.

In various embodiments, and with reference to FIG. 1, a gas turbine engine 120 is disclosed. Gas turbine engine 120 may comprise a two-spool turbofan that generally incorporates a fan section 122, a compressor section 124, a combustor section 126, and a turbine section 128. Gas turbine engine 120 may also comprise, for example, an augmenter section, and/or any other suitable system, section, or feature. In operation, fan section 122 may drive air along a bypass flow-path B, while compressor section 124 may further drive air along a core flow-path C for compression and communication into combustor section 126, before expansion through turbine section 128. FIG. 1 provides a general understanding of the sections in a gas turbine engine, and is not intended to limit the disclosure. The present disclosure may extend to all types of applications and to all types of turbine engines, including, for example, such as turbojets, turboshafts, and three spool (plus fan) turbofans wherein an intermediate spool includes an intermediate pressure compressor ("LPC") between a Low Pressure Compressor ("LPC") and a High Pressure Compressor ("HPC"), and an Intermediate Pressure Turbine ("IPT") between the High Pressure Turbine ("HPT") and the Low Pressure Turbine ("LPT").

In various embodiments, gas turbine engine 120 may comprise a low speed spool 130 and a high speed spool 132 mounted for rotation about an engine central longitudinal axis A-A' relative to an engine static structure 136 via one or more bearing systems 138 (shown as, for example, bearing system 138-1 and bearing system 138-2 in FIG. 1). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or first) compressor section ("LPC") 144, and a low pressure (or first) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or second) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and may rotate via bearing systems 138 about engine central longitudinal axis A-A'. As used herein, a "high pressure" compressor and/or turbine may experience a higher pressure than a corresponding "low pressure" compressor and/or turbine.

In various embodiments, the air along core airflow C may be compressed by LPC 144 and HPC 152, mixed and burned with fuel in combustor 156, and expanded over high pressure turbine 154 and low pressure turbine 146. Mid-turbine frame 157 may comprise airfoils 159 located in core airflow path C. Low pressure turbine 146 and high pressure turbine 154 may rotationally drive low speed spool 130 and high speed spool 132, respectively, in response to the expansion.

Figure 2:
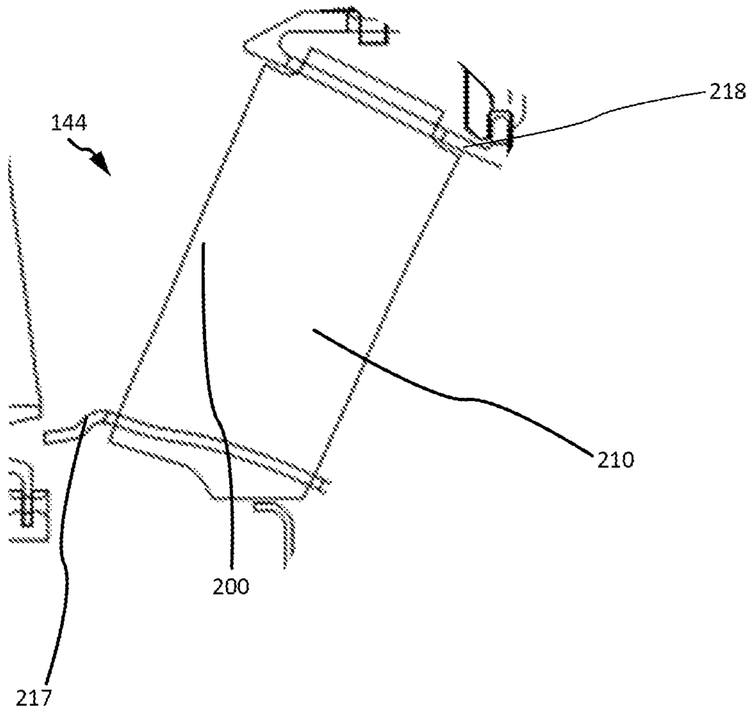
FIG. 2 illustrates a low pressure compressor section of a gas turbine engine, in accordance with various embodiments.

In various embodiments, and with reference to FIG. 2, LPC 144 of FIG. 1 is depicted in greater detail. Inflowing air may proceed through LPC 144 and into a stator assembly 200. The inflowing air may travel through a stator assembly 200, configured to define an air flow path from the rotating LPC 144 module to HPC 152 (from FIG. 1). In various embodiments, stator assembly 200 may be mounted adjacent to HPC 152 (from FIG. 1), in gas turbine engine 120. Stator assembly 200 may comprise a full ring stator assembly, wherein a plurality of stator assemblies 200 may be located circumferentially around the defined airflow path.

In various embodiments, stator assembly 200 may increase pressure in LPC 144, and straighten and direct air flow. Stator assembly 200 may comprise an inner diameter (ID) ring 217 radially spaced apart from an outer diameter (OD) ring 218. In various embodiments, OD ring 218 may form a portion of an outer core engine structure, and ID ring 217 may form a portion of an inner core engine structure to at least partially define an annular core gas flow. In various embodiments, stator assembly 200 may be configured to couple to the inside of gas turbine engine 120 using any suitable method known in the art, such as, for example, via OD ring 218 and ID ring 217. For example, OD ring 218 and ID ring 217 may each comprise a tab located on a radially outward surface (from engine central longitudinal axis A-A'), configured to couple with a slot in the inside of gas turbine engine 120. In various embodiments, an exit guide vane 210 may be coupled at a first end to OD ring 218 and coupled at a second end to ID ring 217. Exit guide vane 210 may be configured to reduce airflow swirl and direct airflow into HPC 152 (from FIG. 1).

Figure 3:
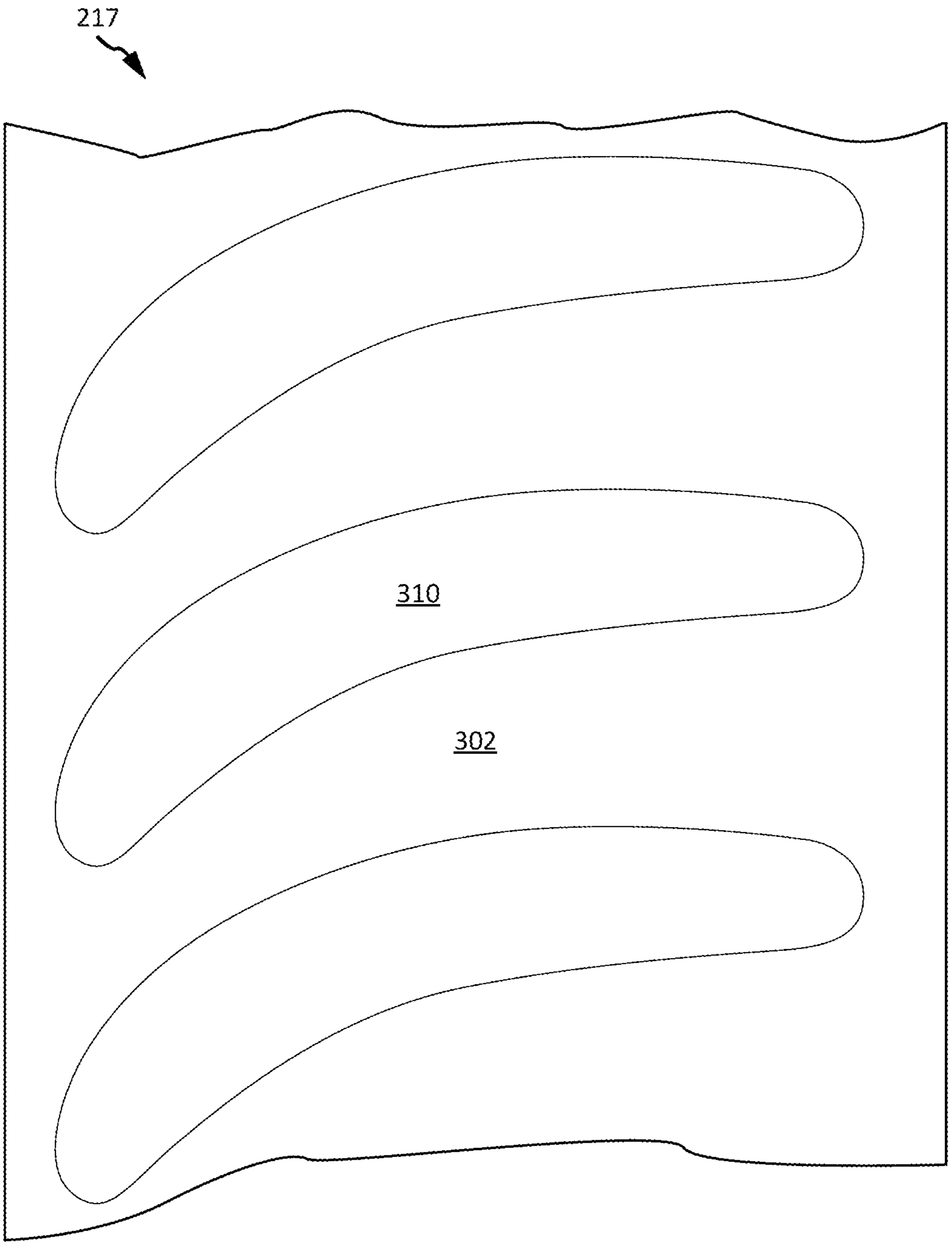
FIG. 3 illustrates a top view of an inner diameter (ID) ring of a stator assembly, in accordance with various embodiments.

Referring now to FIG. 3, a top view of a portion of an ID ring 217, in accordance with various embodiments, is illustrated. The ID ring 217 may comprise a slot 310 disposed in a radially outer surface 312 of ID ring 217. The slot 310 may be configured to receive a respective exit guide vane 210 from FIG. 2. Similarly, OD ring 218 may comprise a corresponding slot on a radially inner surface opposite the slot 310 of the ID ring 217. The slot of the OD ring 218 may be configured to receive a radially outer end of the respective exit guide vane 210.

Figure 4:
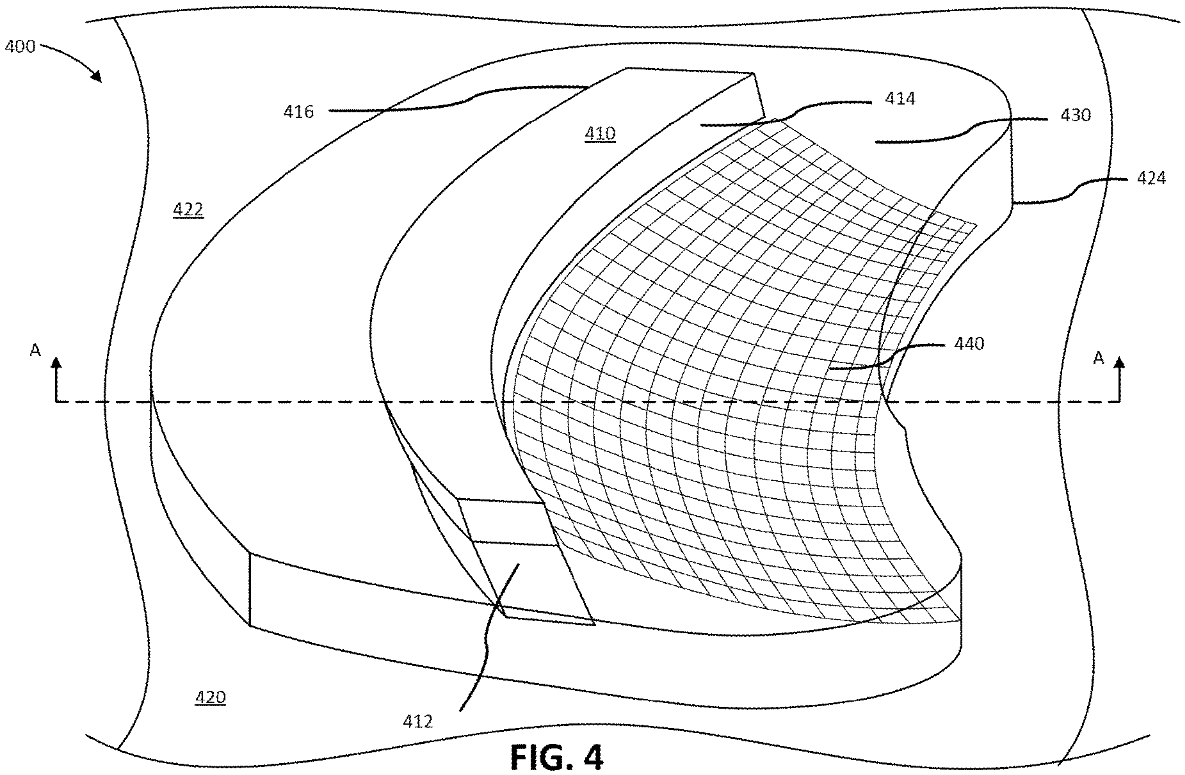
FIG. 4 illustrates a perspective view of a portion of a stator assembly, in accordance with various embodiments.

Referring now to FIG. 4, a portion of a stator assembly 400, in accordance with various embodiments, is illustrated. The stator assembly 400 comprises vane 410 (e.g., exit guide vane 210), a ring 420 (e.g., ID ring 217 or OD ring 218), a potting component 430 (e.g., a liquid sealant that cures to a solid state and joins a first component to a second component), and a potting embedded component 440. The vane 410 comprises a root 412, a pressure side 414 and a suction side 416. The root 412 may be disposed within the potting component 430. In various embodiments, vane 410 may be made from any type of metal known in the art. For example, vane 410 may comprise an aluminum alloy, titanium alloy, or the like. ring 420 comprises a non-gas path surface 422. A "gas path surface" as defined herein is a surface exposed to the core flow path C (from FIG. 1) during normal operation of the gas-turbine. As such, a "non-gas path surface" as defined herein, is a surface that is not exposed to the core flow path C (from FIG. 1) during normal operation of the gas-turbine engine. Similar to vane 410, ring 420 may comprise any type of metal known in the art, such as an aluminum alloy, titanium alloy, or the like.

In various embodiments, the vane 410 is coupled to the ring 420 by the potting component 430. For example, a portion of the potting component 430 may be disposed in a slot of ring 420 and disposed between the ring 420 and the root 412 of vane 410. During assembly, a first layer of the potting component 430 may be in liquid form and completely fill slot 424 of ring 420. Next, a potting embedded component 440 may be disposed on the first layer of the potting component 430 proximate the pressure side 414 of vane 410. Then, a second layer of the potting component 430 may be disposed on the embedded potting component, which may sandwich the potting embedded component 440 between the first layer and the second layer of the potting component 430. The potting component 430 may then be cured and join the root 412 of vane 410 to ring 420. The potting component 430 may be a thermoplastic elastomer, silicone, silicone rubber, natural rubber, or the like. In various embodiments, the potting component 430 is made of silicone rubber.

Figure 5:
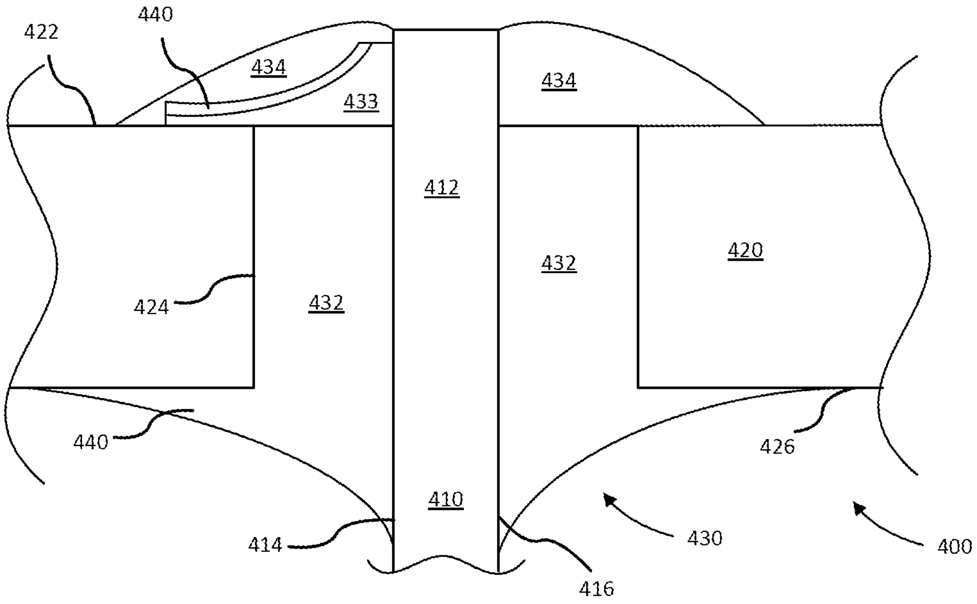
FIG. 5 illustrates a cross-sectional view of a portion of a stator assembly, in accordance with various embodiments.
Figure 6A:
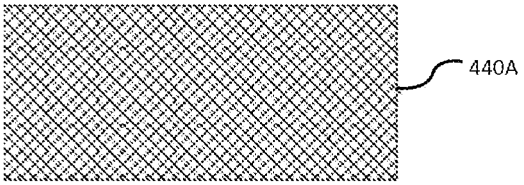
FIG. 6A illustrates a potting embedded component of a stator assembly, in accordance with various embodiments.
Figure 6B:
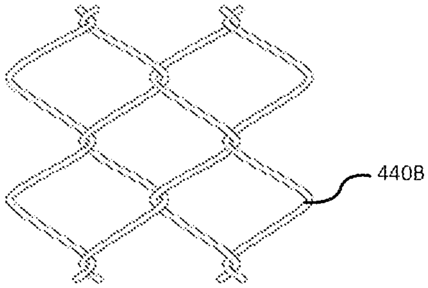
FIG. 6B illustrates a potting embedded component of a stator assembly, in accordance with various embodiments.

Referring now to FIG. 5, a cross-sectional view of stator assembly 400 from FIG. 4 along section line A-A, in accordance with various embodiments, is illustrated. The ring 420 may further comprise a slot 424 disposed through ring 420 extending from the non-gas path surface 422 to a gas-path surface 426. In various embodiments, root 412 of vane 410 is disposed in slot 424 of ring 420. In various embodiments, a first layer 432 of potting component 430 may be disposed in slot 424 of ring 420 between the slot 424 and the root 412. This may ensure that the vane 410 and the ring 420 are not in direct contact. Next, a second layer 433 of the potting component 430 may be disposed on pressure side 414 of vane 410 proximate the non-gas path surface 422 of ring 420. The second layer 433 may have a first end that is tangent to a surface of pressure side 414 and a second end that is tangent to non-gas path surface 422. In various embodiments, the potting embedded component 440 is disposed on the second layer of the potting component 430. Similar to the second layer 433 of the potting component 430, potting embedded component 440 may have a first end that is tangent to a surface of pressure side 414 and a second end that is tangent to non-gas path surface 422. A third layer 434 of potting component 430 may be disposed on the second layer 433 and first layer 432 of the potting component and extend around a perimeter of vane 410 (as shown in FIG. 4) and further couple root 412 of vane 410 to non-gas path surface 422. As such, potting embedded component 440 may be completely embedded in potting component 430.

In various embodiments, and with reference to FIGS. 4, 5, 6A, and 6B, the potting embedded component 440 may be any suitable structure. For example, potting embedded component 440 may be woven and/or braided (e.g., potting embedded component 440A) and/or a chain-link structure (e.g., potting embedded component 440B). In various embodiments, potting embedded component 440 may also be any suitable material to reduce internal tension of the potting component 430 during operation of the gas-turbine engine. For example, potting embedded component 440 may be metallic or non-metallic. In various embodiments, potting embedded component is made of plastic, or the like. Plastic may reduce cost of the assembly and/or strengthen the bond of the potting component during operation. In various embodiments, the potting embedded component 440 may be shaped to maximize a surface area of the potting embedded component 440 disposed in the rubber (e.g., the first end of the potting embedded component 440 is tangent to the pressure side surface and the second end of the potting embedded component 440 is tangent to the radially outer surface 422 of the ID ring 420.

Figure 7:
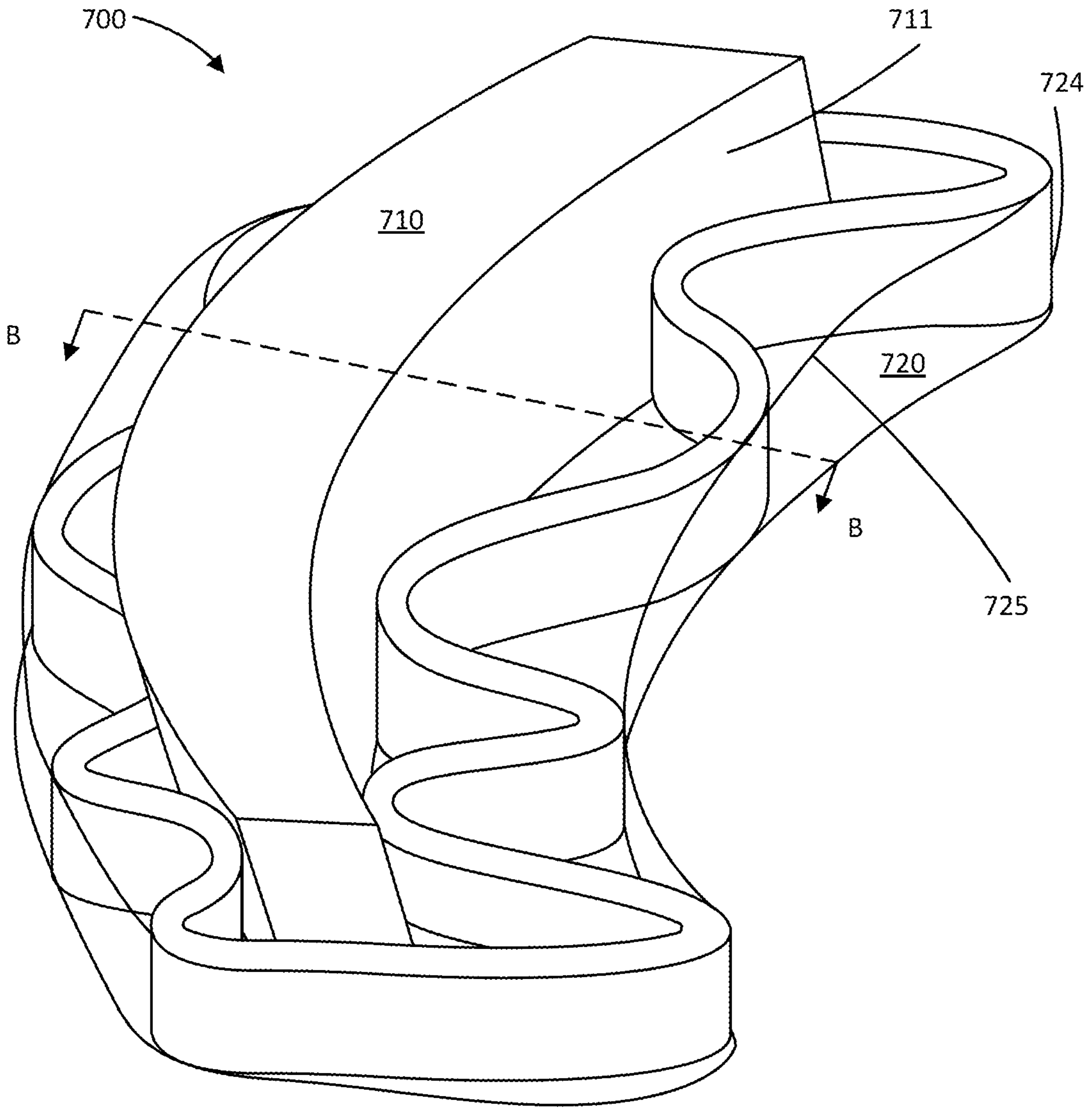
FIG. 7 illustrates a perspective view of a portion of a stator assembly, in accordance with various embodiments.

Referring now to FIG. 7, a portion of a stator assembly 700 prior to bonding of a potting component, in accordance with various embodiments, is illustrated. The stator assembly 700 comprises vane 710, ring 720 (e.g., ID ring 217 or ID ring 218), and a potting embedded component 740. The potting embedded component 740 may be disposed in a slot 724 of stator assembly 700. In various embodiments, the potting embedded component 740 may extend around a perimeter of vane 710. The potting embedded component 740 may be in a serpentine shape and contact a portion of a vane outer surface 711 followed by a portion of a slot surface 725 disposed opposite the vane outer surface 711.

Figure 8:
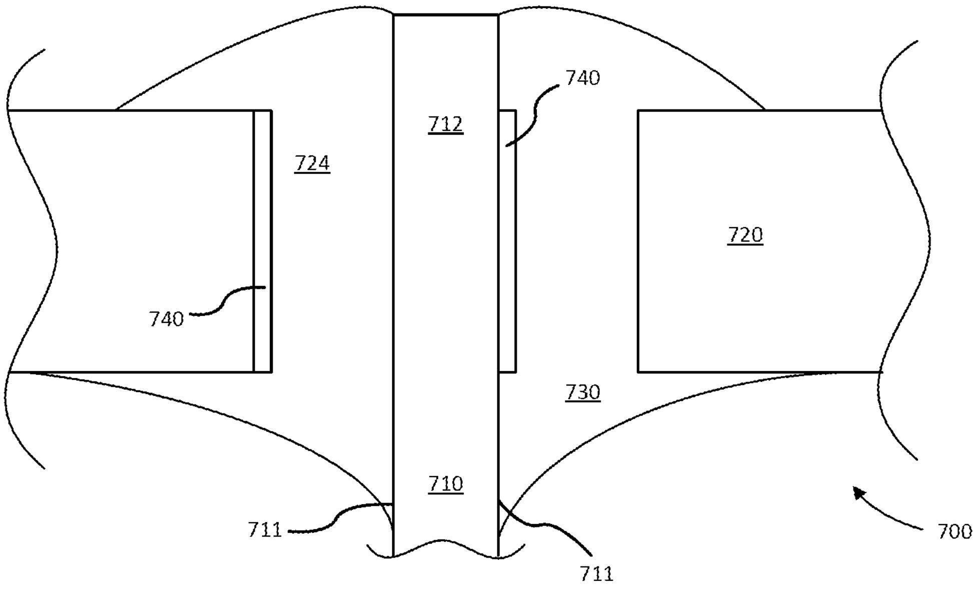
FIG. 8 illustrates a cross-sectional view of a portion of a stator assembly, in accordance with various embodiments.

Referring now to FIG. 8, a cross-section of stator assembly 700 from FIG. 7 along section line B-B after bonding of a potting component, in accordance with various embodiments, is illustrated. After the potting embedded component 740 is disposed within slot 724 in accordance with FIG. 7, potting component 730 in liquid form may be disposed in slot 724 between potting embedded component 740, slot 724, and vane 710. In various embodiments, potting embedded component 740 may contact a portion of a vane outer surface 711 proximate a root 712 of vane 710 and/or a portion of a wall of slot 724 that is opposite the vane outer surface 711. In various embodiments, the potting embedded component 740 has a material stiffness that is greater than a material stiffness of the potting component 730. As such, a load through the vane 710, during operation of the gas turbine engine, may be absorbed by the potting embedded component 740 and/or decrease stress in the potting component 730. As such, the potting embedded component 740 may prevent disbond of the potting component 730 during operation.

In various embodiments, potting embedded component 740 may be any suitable structure. For example, potting embedded component 740 may be a sheet, as illustrated in FIGS. 7 and 8, or the like. In various embodiments, potting embedded component 740 may also be any suitable material to prevent internal tension of the potting component 730 during operation of the gas-turbine engine. For example, potting embedded component 740 may be non-metallic to prevent metal to metal contact. In various embodiments, potting embedded component 740 is made of a thermoset or thermoplastic, or the like. Thermoplastic may reduce cost of the assembly and/or strengthen the bond of the potting component during operation. In various embodiments, the potting embedded component 740 may be shaped to maximize a surface area of the potting embedded component 740 disposed in the potting component 730 (e.g., the frequency of a serpentine pattern may be increased to provide greater surface area of the potting embedded component 740).

Figure 9:
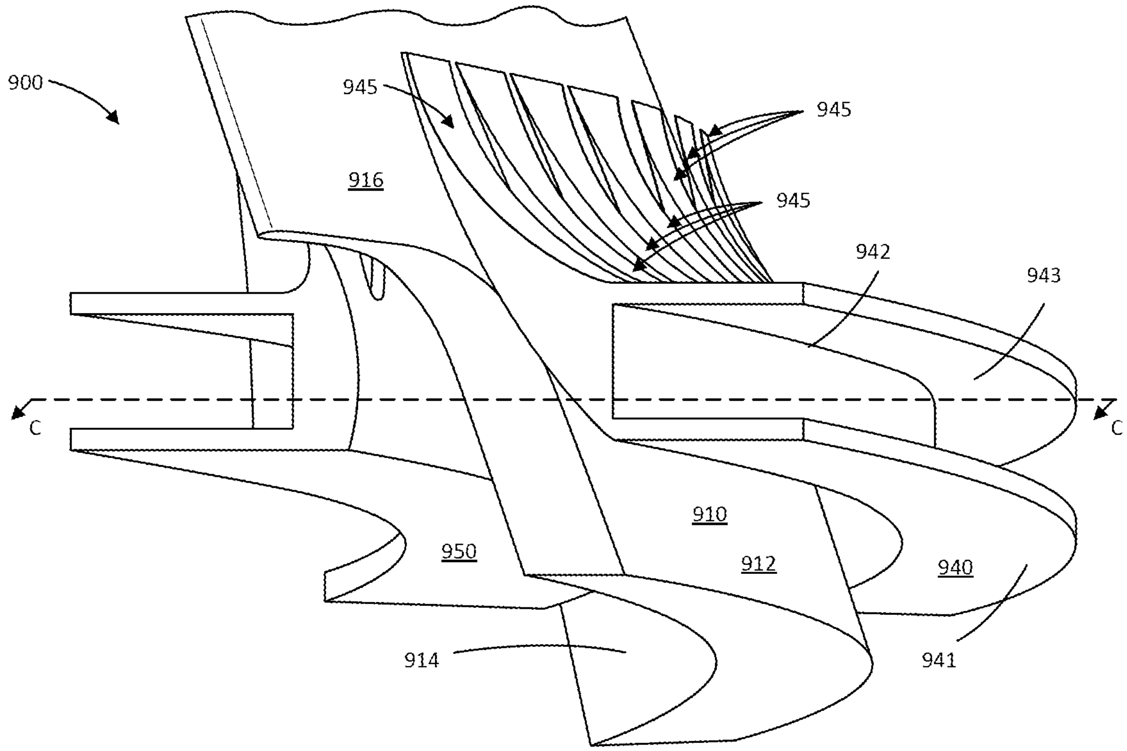
FIG. 9 illustrates a perspective view of a portion of a stator assembly, in accordance with various embodiments.

Referring now to FIG. 9, a portion of a stator assembly 900 prior to bonding of a potting component without a ring, in accordance with various embodiments, is illustrated. The stator assembly 900 comprises vane 910, a first potting embedded component 940 and a second potting embedded component 950. The first potting embedded component 940 may be disposed on a suction side 916 of the vane 910. The second potting embedded component 950 may be disposed on a pressure side 914 of the vane 910.

Figure 10:
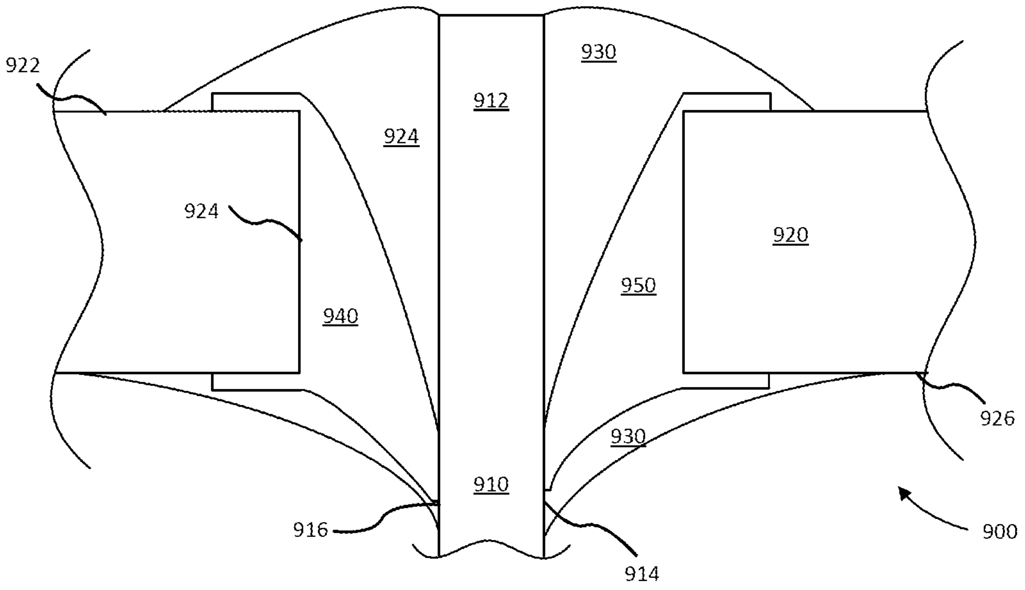
FIG. 10 illustrates a cross-sectional view of a portion of a stator assembly, in accordance with various embodiments.

In various embodiments, the first potting embedded component 940 comprises a groove 942 disposed between a first flange 941 and a second flange 943. The groove 942 may be configured to receive ring therebetween (as shown in FIG. 10). In various embodiments, the first flange 441 contacts a gas-path surface of ring and the second flange 943 contact a non-gas path surface of ring 920. The first potting embedded component 940 may further comprise a plurality of fingers 945 extending from the second flange 943 toward suction side 916 of the vane 910 and radially away from a gas-path surface of a ring. In various embodiments, first potting embedded component 940 is deformable. Each finger in the plurality of fingers 945 may include an outer surface having a convex shape. The convex shape of the outer fingers may guide a potting component during injection of the potting component in liquid form (i.e., the potting component in liquid form may be screed over the convex surface and fill gaps between adjacent fingers) and/or create an easier manufacturing process to create a fillet with the potting component.

In various embodiments, the second potting embedded component 950 may comprise the same features of the first potting component with respect to the pressure side 914 of vane 910. During assembly, a root 912 of vane 910 may be disposed between the first potting embedded component 940 and the second potting embedded component 950 and into slot of a ring (e.g., ID ring 217 or OD ring 218). The plurality of fingers of each potting embedded component 940, 950 may deform and receive the root 912 of vane 910 and press the groove of each potting embedded component 940 against a respective wall of a respective slot. Next, a potting component in liquid form is injected into the slot, and along the plurality of fingers of each potting embedded component 950. Then, the potting component is cured, fully embedding each potting embedded component 940, 950.

Referring now to FIG. 10, a cross-section of stator assembly 900 from FIG. 9 along section line C-C after bonding of a potting component to a ring 920 (e.g., ID ring 217 or OD ring 218), in accordance with various embodiments, is illustrated. After the potting embedded component 940 is disposed within slot 924 in accordance with FIG. 9, potting component 930 in liquid form may be disposed in slot 924 between potting embedded component 940, non-gas path surface 922 of ring 920, gas-path surface 926 of ring 920, and vane 910. In various embodiments, each finger in the plurality of fingers of each potting embedded component 940, 950 may contact a portion of the suction side 916 or the pressure side 914 proximate a root 912 of vane 910. The groove in each potting embedded component 940, 950 may receive a wall of slot 924 that is opposite either the pressure side 914 or the suction side 916. The groove of each potting embedded component 940, 950 may secure each potting embedded component 940, 950 to a respective wall of ring 920 within slot 924. As such, the potting embedded components 940, 950 may prevent disbond of the potting component 930 during operation.

In various embodiments, each potting embedded component 940, 950 may be any suitable material to prevent internal tension of the potting component 930 during operation of the gas-turbine engine. For example, potting embedded component 940 may be non-metallic to prevent any metal to metal contact. In various embodiments, each potting embedded component 940, 950 is made of plastic, or the like. Plastic may reduce cost of the assembly and/or strengthen the bond of the potting component during operation.

Although described herein with respect to an ID ring of a stator assembly, an OD ring of a stator assembly in accordance with the ID ring described herein is within the scope of this disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stator assembly comprising:

a vane comprising a suction side and a pressure side;

a ring having a slot configured to receive the vane;

a potting component disposed between the vane and the ring, the potting component configured to join the vane and the ring;

a first potting embedded component disposed on the suction side of the vane, the first potting embedded component disposed within the potting component; and a second potting embedded component disposed on the pressure side of the vane, the second potting embedded component disposed within the potting component, wherein the first potting embedded component comprises a first flange and a second flange disposed radially outward from the first flange, the second flange defining a groove, and wherein the groove receives a wall defined by the slot of the ring.

2. The stator assembly of claim 1, wherein the first potting embedded component comprises a plurality of fingers, each finger in the plurality of fingers extending from the second flange toward the vane and radially away from the second flange.

3. The stator assembly of claim 2, wherein each finger in the plurality of fingers includes a convex surface opposite the vane.

4. The stator assembly of claim 1, wherein the first potting embedded component and the second potting embedded component are deformable.

5. The stator assembly of claim 1, wherein the first potting embedded component and the second potting embedded component are configured to receive the vane during assembly of the stator assembly.

6. A gas-turbine engine comprising:

a stator assembly, comprising:

an inner diameter (ID) ring;

an outer diameter (OD) ring disposed radially outward from the ID ring;

a vane disposed between the ID ring and the OD ring;

a slot disposed in at least one of the ID ring or the OD ring;

a potting component disposed in the slot, the potting component coupling the vane to the slot;

a first potting embedded component disposed within the potting component on a pressure side of the vane; and a second potting embedded component disposed within the potting component on a suction side of the vane, wherein the first potting embedded component and the second potting embedded component each comprise a first flange and a second flange disposed radially outward from the first flange, the second flange defining a groove, and wherein the groove receives a wall defined by the slot of one of the ID ring and the OD ring.

7. The gas-turbine engine of claim 6, wherein the first potting embedded component and the second potting embedded component each comprises a non-metallic material.

8. The gas-turbine engine of claim 6, wherein the first potting embedded component and the second potting embedded component each comprises a plurality of fingers, each finger in the plurality of fingers extending from the second flange toward the vane and radially away from the second flange.

* * * * *